United States Patent Office 2,783,198
Patented Feb. 26, 1957

2,783,198

AMINO-ALKYL-SULFONIC ACID CHLORIDE-HYDROCHLORIDES

Hans Feichtinger, Duisburg-Beeck, Hans Tummes, Duisburg-Meiderich, and Siegfried Puschhof, Duisburg-Beeck, Germany, assignors to Ruhrchemie Aktiengesellschaft, Oberhausen-Holten, Germany, a corporation of Germany No Drawing. Application November 5, 1953, Serial No. 390,416

Claims priority, application Germany November 24, 1952

8 Claims. (Cl. 204—158)

This invention relates to and has as its object the production of amino-alkyl-sulfonic acid chloride-hydrochlorides.

In accordance with the invention, novel hydrochlorides of amino-alkyl-sulfonic acid chlorides are obtained by contacting aliphatic amine hydrochlorides having 3 to 6 carbon atoms with chlorine and sulfur dioxide-containing gases in the presence of chlorohydrocarbons and particularly carbon tetrachloride or chloroform, while irradiating with actinic light and thereafter washing the resulting sulfochlorination products obtained with chloroform. The aliphatic amine hydrochlorides are preferably suspended in the chlorohydrocarbon, such as the carbon tetrachloride.

The residue obtained after the washing with chloroform is in the form of a colorless crystal powder consisting of practically pure hydrochloride of amino-sulfonic acid chloride. The hydrolysis of these sulfochlorides will result in a quantitative yield of amino alkyl sulfonic acids.

The chloroform used will contain after the washing, chlorinated amine chlorides and the unconverted amine hydrochloride, which may again be used for the sulfochlorination.

Aliphatic amine hydrochlorides which may be used as starting products in accordance with the invention, include, for example: n-butylamine-hydrochloride, n-pentylamine-hydrochloride or n-hexylamine-hydrochloride. In addition, the hydrochlorides of secondary, tertiary and quaternary alkamines may also be used.

The treatment of the starting amine-hydrochlorides with chlorine and sulfur dioxide is effected in the presence of a chlorohydrocarbon, preferably carbon tetrachloride or chloroform, in which the hydrochlorides are dissolved or suspended. The quantitative proportion of amine hydrochlorides and the diluent may range between 1:5 and 1:20, the preferred ratio being 1:10.

The molar ratio of chlorine to sulfur dioxide in the gas used for contacting may range between 1:1 and 1:3, and is preferably 1:1.3.

The sulfochlorination reaction may be effected in the temperature range of approximately 10–65° C. with the exclusion of moisture.

The washing of the raw sulfochlorination product may be effected at room temperature and at atmospheric pressure and may, if desired, be carried out in the same reaction vessel as the sulfochlorination.

In accordance with an embodiment of the invention in which the sulfo-chlorination and the reaction is effected in a single reaction vessel, the hydrochlorides of the amine alkyl sulfonic acid chlorides are directly recovered. In this case, for example, the sulfo-chlorination is effected with the alkamine hydrochloride dissolved in an amount of chloroform, so that only the more difficultly soluble hydrochloride of the amine alkyl sulfonic acid will separate from the chloroform solution.

The novel hydrochlorides of the amine alkyl sulfonic acid chlorides obtained in accordance with the invention are particularly suited for intermolecular condensation to form sultames and for intermolecular condensation to form long-chain and cyclic polyamino sulfonic acid amides, since they contain an amino chloride and a sulfonic acid chloride group in the same molecule. Conversions of the sulfonic acid chloride group and the substitution of the amino group make the new hydrochlorides valuable starting materials for further organic syntheses.

It is also possible within the scope of the invention to effect the sulfo-chlorination of the amino hydrochlorides continuously in chloroform. The hydrochloride of the amine alkyl sulfonic acid chloride will precipitate in solid form during the reaction and may be continuously separated from the reaction solution by filtration. The filtered solution, after having been charged with further quantities of the aliphatic amine hydrochloride to be treated is further contacted with sulfur dioxide and chlorine and returned into the cycle.

The following examples are given by way of illustration and not limitation:

Example 1

Through a solution of 30 grams of anhydrous n-butylamine in 300 cc. carbon tetrachloride, which was placed into a tubular glass apparatus provided with stirrer, reflux condenser, inlet pipe for the gases, and a drain cock, there was passed, while stirring, a weak current of hydrogen chloride until the amine had completely converted into the hydrochloric salt. While irradiating with a mercury vapor lamp and vigorously stirring, gaseous chlorine and sulfur dioxide in a ratio of 1:1.3 were passed through the reaction mixture, while the temperature was maintained at 50–60° C. After 5–6 hours, the reaction was terminated. Following this, the reaction mixture in which the sulfochlorination product was suspended was cooled to room temperature and passed through the lower drain cock into a washing vessel which contained in the lower part a glass filter plate and could be closed on top by means of a ground-in stopper. The raw sulfochlorination product remaining on the filter plate after having sucked off the liquid was washed a number of times with 150 cc. units of alcohol-free chloroform while vigorously shaking until the chloroform left no solid residue upon evaporation. This washing generally required 450 cc. of chloroform.

The washed product which had been freed by a dry air stream from solvents adhering thereto amounted to 48 grams. It represented a white crystal powder which was rather stable in the air and altered only very slowly with the evolution of hydrogen chloride. The chemical composition corresponded very closely to the 1-amino-butane-sulfurylchloride-(x)-hydrochloride $$(C_4H_{11}O_2NSCl_2)$$

| Analysis | Calculated | Found |
|---|---|---|
| | Percent | Percent |
| C | 23.09 | 23.24 |
| H | 5.33 | 5.72 |
| O | 15.38 | 15.83 |
| N | 6.73 | 6.31 |
| S | 15.41 | 15.40 |
| Cl | 34.09 | 33.91 |

The hydrochloride could be recrystallized unchanged from absolute dioxane and was obtained therefrom in crystals which gradually decomposed above 120° C. while melting. The hydrolysis resulted in an almost quantitative yield of 1-amino-butane-sulfonic acid-(x). Furthermore, it was possible by the action of alkalis to obtain from 1-amino-butane-sulfuryl chloride-(x)-hydrochloride, by ring-closure reaction, the two sultames of 1-amino-butane-sulfonic acid-(4) and 1-amino-butane-sulfonic acid-(3).

Example 2

10 grams 1-amino-butane sulfochloride-(x)-hydrochloride, the prepartion of which may be seen above, were dissolved in 30 cc. ice water and mixed with 10 cc. cold concentrated caustic soda solution (9 times normal, 0° C.). The alkaline solution was weakly acidified by means of hydrochloric acid and exhaustively extracted with ether in a perforator. By evaporating the dried ether extracts, there was obtained 5.3 grams of a colorless oil from which the isomeric sultames of 1-amino-butane-sulfonic acid-(3) and -(4), respectively, could be recovered. These sultames had the following structural formulae:

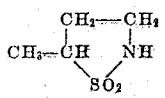

and

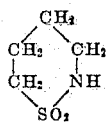

Molecular weight: 135:18
Formula: $C_4H_9O_2NS$

| Analysis | Calculated | Found |
| --- | --- | --- |
|  | Percent | Percent |
| C | 35.54 | 35.00 |
| H | 6.71 | 6.97 |
| O | 23.67 | 23.52 |
| N | 10.36 | 10.09 |
| S | 23.72 | 23.43 |

Example 3

30 grams anhydrous n-pentylamine dissolved in 300 cc. carbon tetrachloride were at first converted into the hydrochloric salt and then sulfochlorinated with chlorine and sulfur dioxide, while being irradiated, in the manner described in Example 1. The molar ratio of chlorine to sulfur dioxide was 1:1.3; the reaction temperature was 50°–60° C. At at flow rate of the chlorine of 2.64 liters per hour, the reaction was terminated in 4–5 hours. The crystal slurry was sucked off and washed three times with 150 cc. alcohol-free chloroform in the same washing vessel, while vigorously shaking. The washed dried residue amounted to 35 grams and represented a colorless crystal powder. The elementary analysis corresponded exactly to the composition of the pure 1-amino-pentane-sulfurylchloride-(x)-hydrochloride ($C_5H_{13}O_2NSCl_2$).

| Analysis | Calculated | Found |
| --- | --- | --- |
|  | Percent | Percent |
| C | 27.33 | 27.02 |
| H | 5.85 | 6.07 |
| N | 6.30 | 6.07 |

The hydrolysis resulted in a quantitative yield of 1-amino-pentane-sulfonic acid-(x).

Example 4

A mixture of 30 grams anhydrous n-hexylamine and 300 cc. carbon tetrachloride was converted into the hydrochloric salt in the manner described in Example 1 and treated with chlorine and sulfur dioxide in a ratio of 1:1.5 at a reaction temperature of 30°–40° C. With a flow rate of the chlorine 2.46 liters per hour the reaction was terminated in 6 hours. The reaction product separated in a viscous layer above the carbon tetrachloride solution was evaporated to dryness under vacuum at 30° C. and washed several times with chloroform. According to the analysis, the washed residue consisted of 1-amino-hexane-sulfurylchloride-(x)-hydrochloride ($C_6H_{15}O_2NSCl_2$).

| Analysis | Calculated | Found |
| --- | --- | --- |
|  | Percent | Percent |
| C | 30.51 | 30.32 |
| H | 6.36 | 6.53 |
| N | 5.93 | 5.81 |

Saponification with water resulted in a quantitative yield of 1-amino-hexane-sulfonic acid-(x).

Example 5

30 grams anhydrous n-butylamine dissolved in 300 cc. alcohol-free dry chloroform were converted into the hydrochloric salt in the manner described in Example 1. In doing so, the solution remained completely clear. By passing in chlorine and sulfur dioxide while irradiating, the sulfochlorination was thereupon carried out in the manner described. The molar ratio of chlorine to sulfur dioxide was 1:1.3. The reaction temperature was 35–40° C. At a flow rate of the chlorine of 2.46 liters per hour, the hydrochloride of the 4-amino-butane-sulfurylchloride precipitated suddenly after 6 hours. The sulfochlorination was continued for further 3 hours. The precipitated crystal slurry was sucked off and washed several times with chloroform. The product obtained had the same properties and the same composition as the hydrochloride of 1-amino-butane-sulfurylchloride-(x)-hydrochloride described in Example 1.

We claim:

1. Process for the production of hydrochlorides of amino-alkyl-sulfonic acid chlorides having 3 to 6 carbon atoms which comprises contacting a primary saturated aliphatic amine hydrochloride having 3 to 6 carbon atoms with a chlorine and sulfur dioxide-containing gas in the presence of a member selected from the group consisting of chloroform and carbon tetrachloride while irradiating with actinic light, washing the resulting sulfochlorination product obtained with chloroform, and recovering a hydrochloride of an amino-alkyl-sulfonic acid chloride.

2. Process according to claim 1, in which said washing and said recovery are effected by filtering the liquid off from the solid reaction product.

3. Process according to claim 1, in which said chlorine sulfur dioxide-containing gas contains 1:3 parts by volume of sulfur dioxide per part by volume of chlorine.

4. Process according to claim 1, in which said gas contains 1:1.3 parts by volume of sulfur dioxide per part by volume of chlorine.

5. Process according to claim 1, in which the quantitative proportion of amine hydrochloride and the diluent is 1:5 to 1:20.

6. Process according to claim 5, in which the quantitative proportion of amine hydrochloride and the diluent is 1:10.

7. Process according to claim 1, in which said contacting is effected at a temperature of 10–65° C.

8. Process according to claim 7, in which said contacting is effected in the substantial absence of moisture.

References Cited in the file of this patent

UNITED STATES PATENTS

| 2,193,824 | Lockwood et al. | Mar. 19, 1940 |
| 2,433,997 | Linch | Jan. 6, 1948 |
| 2,483,499 | Lieber et al. | Oct. 4, 1949 |

FOREIGN PATENTS

| 545,521 | Great Britain | June 1, 1942 |